United States Patent
Lapanik et al.

(10) Patent No.: US 10,023,798 B2
(45) Date of Patent: Jul. 17, 2018

(54) LIQUID CRYSTAL COMPOSITIONS COMPRISING MESOGENIC COMPOUNDS, AND DEVICES FOR HIGH-FREQUENCY THECHNOLOGY

(71) Applicant: SAMSUNG ELECTRONICS CO., LTD., Suwon-si (KR)

(72) Inventors: Valeri Ivanovich Lapanik, Minsk (BY); Genadz Mikhailovich Sasnouski, Minsk (BY); Elena Alexandrovna Shepeleva, Kostroma (RU); Gennadiy Alexadrovich Evtyushkin, Moscow (RU); Timofey Victorovich Kamyshev, Moscow (RU); Alexander Nikolayevich Khripkov, Lobnya (RU); Wonbin Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 15/198,032

(22) Filed: Jun. 30, 2016

(65) Prior Publication Data

US 2017/0051202 A1    Feb. 23, 2017

(30) Foreign Application Priority Data

Aug. 19, 2015 (RU) ................................ 2015135180

(51) Int. Cl.
| | | |
|---|---|---|
| *C09K 19/00* | (2006.01) | |
| *C09K 19/12* | (2006.01) | |
| *C09K 19/30* | (2006.01) | |
| *H01Q 3/36* | (2006.01) | |

(52) U.S. Cl.
CPC .......... *C09K 19/12* (2013.01); *C09K 19/3003* (2013.01); *C09K 19/3028* (2013.01); *C09K 2019/123* (2013.01); *C09K 2019/124* (2013.01); *C09K 2019/125* (2013.01); *C09K 2019/3009* (2013.01); *C09K 2019/3016* (2013.01); *C09K 2019/3045* (2013.01); *C09K 2219/11* (2013.01); *H01Q 3/36* (2013.01)

(58) Field of Classification Search
CPC ..................................................... C09K 19/00
See application file for complete search history.

(56) References Cited

U.S. PATENT DOCUMENTS

| | | | |
|---|---|---|---|
| 7,361,288 B2 | 4/2008 | Lussem et al. | |
| 7,732,021 B2 | 6/2010 | Manabe et al. | |
| 8,012,369 B2 | 9/2011 | Saito et al. | |
| 9,193,905 B2 * | 11/2015 | Manabe | C09K 19/12 |
| 2012/0182200 A1 | 7/2012 | Manabe et al. | |
| 2012/0205583 A1 | 8/2012 | Montenegro et al. | |
| 2012/0273724 A1 | 11/2012 | Jasper et al. | |
| 2012/0292608 A1 | 11/2012 | Ise et al. | |
| 2013/0221274 A1 | 8/2013 | Reiffenrath et al. | |
| 2013/0292608 A1 | 11/2013 | Manabe et al. | |
| 2014/0008575 A1 | 1/2014 | Jasper et al. | |
| 2014/0021409 A1 | 1/2014 | Manabe et al. | |
| 2015/0053891 A1 | 2/2015 | Kawamura et al. | |

FOREIGN PATENT DOCUMENTS

| | | |
|---|---|---|
| DE | 102004029429 A1 | 2/2005 |
| EP | 2332944 A2 | 6/2011 |
| EP | 2824161 A1 | 1/2015 |
| RU | 2511009 C2 | 12/2013 |

OTHER PUBLICATIONS

Communication dated Jun. 14, 2016, issued by the Russian Patent Office in counterpart Russian application No. 2015135180/05(053916).

* cited by examiner

*Primary Examiner* — Chanceity Robinson
(74) *Attorney, Agent, or Firm* — Sughrue Mion, PLLC

(57) ABSTRACT

Disclosed are novel mesogenic compounds, liquid crystal compositions (liquid-crystalline media) comprising them and suitable for high-frequency technology, and high-frequency devices using them, such as phase shifters, antennas, tunable filters, switching devices, e.g. operated in the microwave region, to a process for preparing the compositions. The liquid crystal compositions have high optical anisotropy, a positive dielectric anisotropy and a wide temperature range of nematic phases.

9 Claims, No Drawings

LIQUID CRYSTAL COMPOSITIONS COMPRISING MESOGENIC COMPOUNDS, AND DEVICES FOR HIGH-FREQUENCY THECHNOLOGY

CROSS-REFERENCE TO RELATED APPLICATIONS

This application claims the benefit of Russian Patent Application No. 2015135180, filed on Aug. 19, 2015, in the Russian Federal Service for Intellectual Property, the disclosure of which is incorporated herein in its entirety by reference.

BACKGROUND OF THE INVENTION

1. Field

The present disclosure relates to liquid crystal (LC) compositions, i.e., liquid-crystalline media, for high-frequency technology, especially for high-frequency devices, in particular antennas, tunable filters, switching devices operated in the microwave region. These components function based on changing dielectric properties of liquid-crystalline media under an applied voltage.

In addition, the present disclosure relates to novel mesogenic compounds.

2. Description of the Related Art

Liquid-crystalline materials have been used for a long time in liquid crystal displays in order to display information.

Liquid-crystalline materials for high-frequency technology have been disclosed in various patent documents, especially in US 2014/0021409 A1, DE 10 2004 029 429, US 2013/0292608 A1, US 2012/0182200 A1, US 2012/0205583 A1, US 2012/0292608 A1, US 2012/0273724 A1, US 2013/0221274 A1, and US 2014/0008575 A1.

In these patent documents, various liquid crystalline bistolan compounds, also known as triphenyldiacetylenes, are disclosed. For example, US 2012/0182200 A1 discloses various liquid crystalline bistolan compounds containing unfluorinated alkyl, unfluorinated alkoxy or unfluorinated alkenyloxy as a lateral substituent, of the formula:

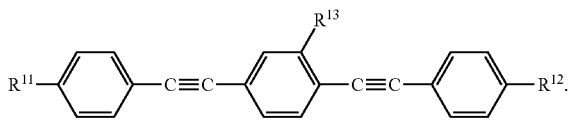

I

However, these compounds are afflicted with a serious disadvantage. The stability of the media is low, in particular under UV irradiation and at high temperatures.

US 2014/0021409 A1 discloses various liquid crystalline bistolan compounds containing different types of a lateral substituent and different polar groups, such as CN, NCS, $SF_5$, $CF_3$, $OCF_3$, F, or Cl, of the formula:

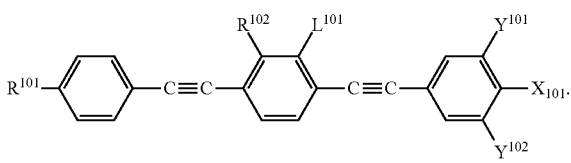

However, these compounds are afflicted with a serious disadvantage. The stability of the media is low, in particular under UV irradiation and at high temperatures.

For liquid-crystalline bistolan compounds containing a lateral methyl group, Hsu, C. S., Shyu, K. F., Chuang, Y. Y. and Wu, S.-T., Liq. Cryst., 27(2), (2000), pages 283-287 proposes to use thereof in liquid crystal optically phased arrays. However, these compounds are afflicted with a serious disadvantage. The stability of the media is low, in particular under UV irradiation and at high temperatures.

Herman, J., Dziaduszek, J., Dabrowski, R., Kedzierski, J., Kowiorski, K., Sai Dasari, V., Dhara, S., Kula, P., Liq. Cryst., 40(09), (2013), pages 1174-1182, mentions new laterally alkyl-substituted quaterphenyl and phenylethynyl-tolane liquid crystals with isothiocyanate terminal group, which are proposed for use as high birefringence materials for different applications, in particular for high-frequency devices. However, these compounds are afflicted with serious disadvantages. Most of them result, besides other deficiencies, in disadvantageously high losses and/or inadequate phase shifts or inadequate material quality.

U.S. Pat. No. 7,183,447 discloses various laterally fluorinated, mesogenic quaterphenyl compounds. However, these compounds are afflicted with serious disadvantages. Most of them result, besides other deficiencies, in disadvantageously high losses and/or inadequate phase shifts or inadequate material quality.

U.S. Pat. No. 7,211,302 discloses, inter alia, liquid-crystalline media which comprise, besides polar terphenyl compounds, various laterally fluorinated, mesogenic quaterphenyl compounds and also comprise a small amount of quaterphenyl compounds of the formula:

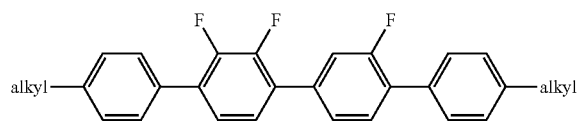

in order to improve the stability of the media, in particular under UV irradiation. However, these compounds are afflicted with serious disadvantages. Most of them result, besides other deficiencies, in disadvantageously high losses and/or inadequate phase shifts or inadequate material quality.

Recently, however, liquid-crystalline media have also been proposed for use in components for microwave technology, such as, for example in DE 10 2004 029 429 A.

Liquid crystalline media which comprise, for example, compounds of the formula:

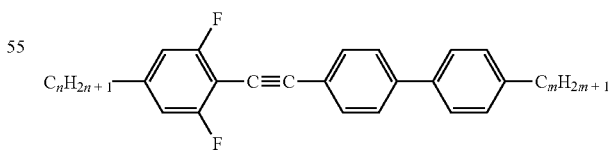

are proposed for use in components for high-frequency technology, for example, in A. Lapanik, "Single compounds and mixtures for microwave applications, Dielectric, microwave studies on selected systems", dissertation, Technical University of Darmstadt, 2009, (D17).

However, these compositions are afflicted with serious disadvantages. Most of them result, besides other deficiencies, in disadvantageously high losses and/or inadequate phase shifts or inadequate material quality. The stability of the media is low, in particular under UV irradiation.

Novel liquid-crystalline media having improved properties are thus necessary. In particular, the loss in the microwave region and/or millimeter wave region must be reduced and the material quality factor be improved.

Thus, there is a considerable demand for liquid-crystalline media having suitable properties for corresponding practical applications.

SUMMARY

In an aspect of one or more embodiments, there is provided liquid-crystalline media with sufficiently high positive dielectric anisotropy ($\Delta\varepsilon$), a suitable, nematic phase range and optical anisotropy ($\Delta n$) which do not have the disadvantages of the prior-art materials, or at least only do so to a considerably reduced extent.

In an aspect of one or more embodiments, there is also provided components for high-frequency technology which do not have the disadvantages of the prior-art materials, or at least only do so to a considerably reduced extent, if selected liquid-crystalline media are employed.

According to an aspect of an exemplary embodiment, such an improved liquid-crystalline medium includes:
at least one compound of the formula I and
at least one compound of the formula II
or
at least one compound of the formula I and
at least one compound of the formula III
or
at least one compound of the formula II and
at least one compound of the formula III
or
at least one compound of the formula I and
at least one compound of the formula II and
at least one compound of the formula III;

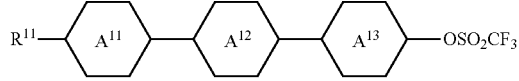
(I)

in which
R$^{11}$, independently of one another, denotes H, an alkyl or an alkoxy having 1 to 17 carbon atoms, or an alkenyl, an alkenoxy or an alkoxy-alkyl having 2 to 15 carbon atoms, and

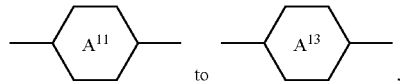

independently of one another, denote

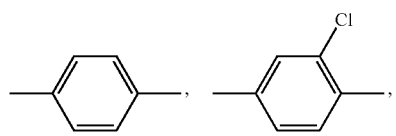

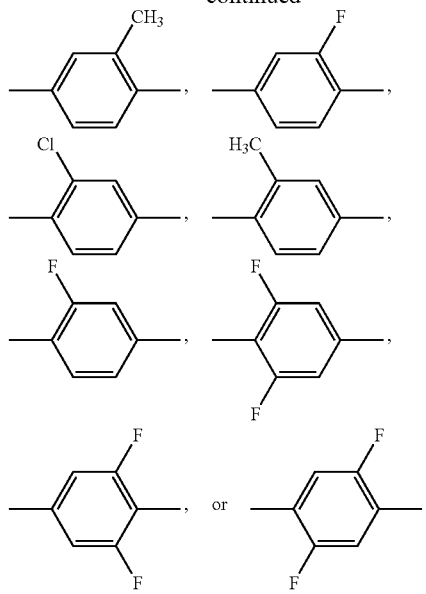

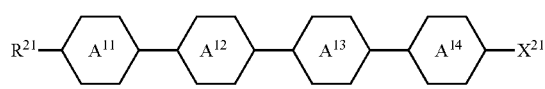
(II)

in which
R$^{21}$, independently of one another, denotes H, an alkyl or an alkoxy having 1 to 17 carbon atoms, or an alkenyl, an alkenoxy or an alkoxy-alkyl having 2 to 15 carbon atoms, X$^{21}$, independently of one another, denotes —NCS or —OSO$_2$CF$_3$,

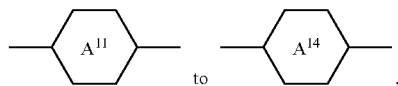

independently of one another, denote

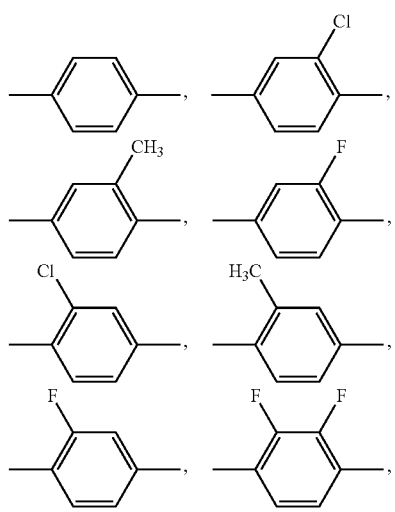

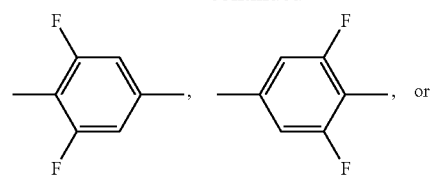

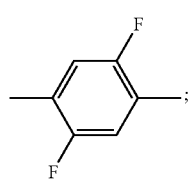

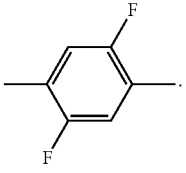

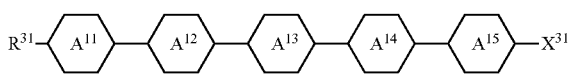

in which
- $X^{31}$, independently of one another, denotes —NCS or —OSO$_2$CF$_3$,
- $R^{31}$, independently of one another, denotes H, an alkyl or an alkoxy having 1 to 17 carbon atoms, or an alkenyl, an alkenoxy or an alkoxy-alkyl having 2 to 15 carbon atoms,

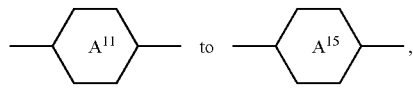

independently of one another, denote

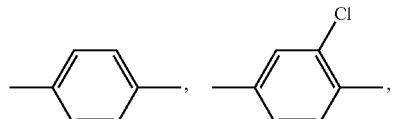

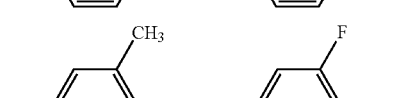

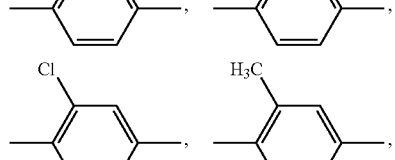

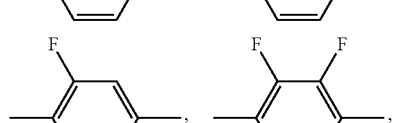

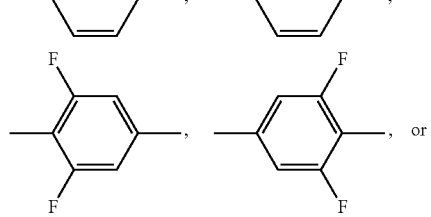

According to an aspect of another exemplary embodiment, such a component for high-frequency technology includes the liquid-crystalline medium according to an aspect of an exemplary embodiment above. Preferably, this component is suitable for operation in the microwave range. Preferably, this component is a phase shifter.

According to an aspect of another exemplary embodiment, there is also provided a microwave antenna array which includes one or more components according to an aspect of another exemplary embodiment above.

In addition, according to an aspect of another exemplary embodiment, there is also provided a process for preparing the liquid-crystalline medium according to an aspect of an exemplary embodiment above, wherein one or more compounds of the formula I are mixed with one or more compounds selected from the compounds of the formulas II and/or III, and optionally with one or more further compounds and/or with one or more additives.

DETAILED DESCRIPTION OF THE EMBODIMENTS

Reference will now be made in detail to embodiments. In this regard, the present embodiments may have different forms and should not be construed as being limited to the descriptions set forth herein. Accordingly, the embodiments are merely described below to explain aspects of the present description. As used herein, the term "and/or" includes any and all combinations of one or more of the associated listed items. Expressions such as "at least one of" or "at least two of," when preceding a list of elements, modify the entire list of elements and do not modify the individual elements of the list.

The liquid-crystalline medium according to an aspect of an exemplary embodiment includes i) at least one compound of the formula I and at least one compound of the formula II; or ii) at least one compound of the formula I and at least one compound of the formula III; or iii) at least one compound of the formula II and at least one compound of the formula III; or iv) at least one compound of the formula I and at least one compound of the formula II and at least one compound of the formula III:

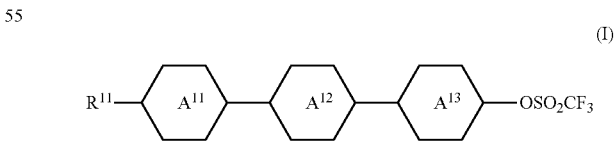

(I)

in which $R^{11}$, independently of one another, denotes H, an alkyl or an alkoxy having 1 to 17 carbon atoms, preferably 3 to 10 carbon atoms, or an alkenyl, an alkenoxy or an alkoxy-alkyl having 2 to 15 carbon atoms, preferably 3 to 10 carbon atoms, preferably an alkyl or an alkenyl; and

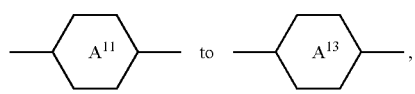 to , independently of one another, denote

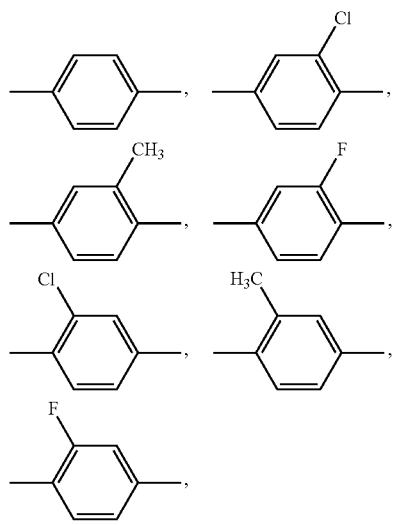

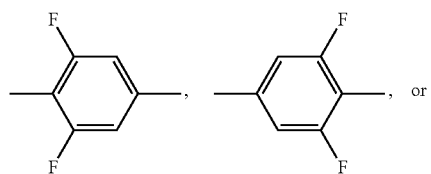

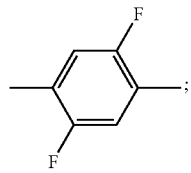;

(II)

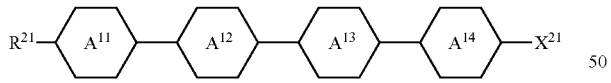

in which $R^{21}$, independently of one another, denotes H, an alkyl or an alkoxy having 1 to 17 carbon atoms, preferably 3 to 10 carbon atoms, or an alkenyl, an alkenoxy or an alkoxy-alkyl having 2 to 15 carbon atoms, preferably 3 to 10 carbon atoms, preferably an alkyl or an alkenyl;

$X^{21}$, independently of one another, denotes —NCS or —OSO$_2$CF$_3$,

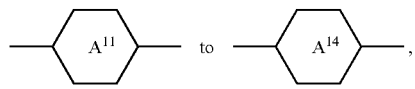

independently of one another, denote

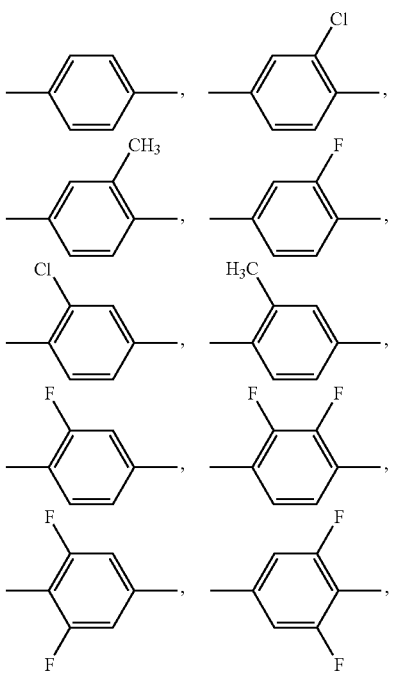

(III)

in which $X^{31}$, independently of the another, denotes —NCS or —OSO$_2$CF$_3$, $R^{31}$, independently of one another, denotes H, an alkyl or an alkoxy having 1 to 17 carbon atoms, preferably 3 to 10 carbon atoms, or an alkenyl, an alkenoxy or an alkoxy-alkyl having 2 to 15 carbon atoms, preferably 3 to 10 carbon atoms, preferably an alkyl or an alkenyl,

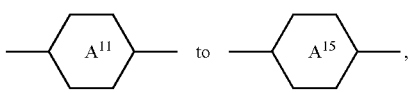

independently of one another, denote

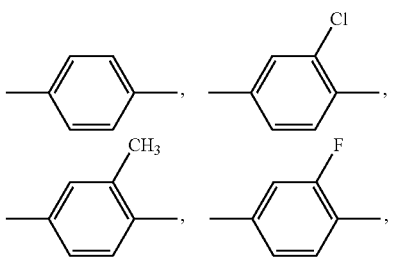

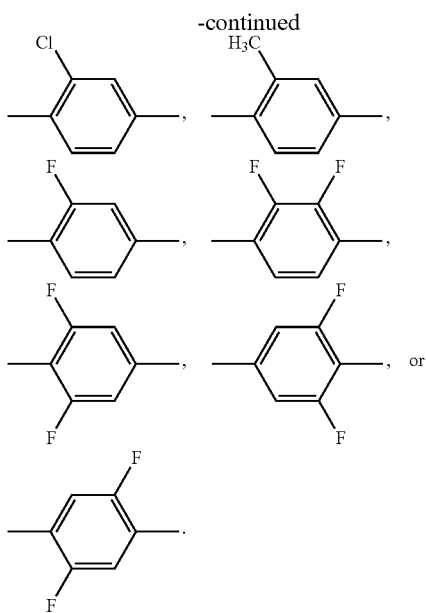

In the present disclosure, the term "alkyl" preferably encompasses straight-chain and branched alkyl groups, as well as cycloalkyl groups, each having 1 to 17 carbon atoms, in particular the straight-chain groups, such as propyl, butyl, pentyl, hexyl, heptyl, octyl, nonyl, decyl, undecyl, dodecyl, tridecyl, tetradecyl, and pentadecyl as well as cyclopropyl and cyclohexyl. Alkyl groups having 3 to 10 carbon atoms are generally preferred.

The term "alkoxy" preferably encompasses straight-chain or branched chain radicals of the formula $C_nH_{2n+1}$—O—, in which n denotes an integer from 1 to 17, in particular the straight-chain groups, such as methoxy, ethoxy, propoxy, butoxy, pentoxy, hexyloxy, heptyloxy, octyloxy, nonyloxy, decyloxy, undecyloxy, dodecyloxy, tridecyloxy, tetradecyloxy, and the like. Alkoxy groups having 3 to 10 carbon atoms are generally preferred. Accordingly, n is preferably 3 to 10.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl, and the like. Alkenyl groups having 3 to 10 carbon atoms are generally preferred. If the alkenyl group can have the E or Z configuration, the E configuration (trans configuration) is generally preferred.

The term "alkenoxy" preferably encompasses straight-chain or branched chain radicals of the formula $C_nH_{2n}$—O—, in which n denotes an integer from 1 to 17, in particular the straight-chain groups, such as $CH_2$=CH—$CH_2$—O—, $CH_3CH$=$CHCH_2$—O—, $CH_2$=CH—$CH_2CH_2$—O—, $CH_2$=CH—$CH_2CH_2CH_2$—O—, $CH_2$=$C(CH_3)CH_2$—O—, $CH_2$=$CH(CH_3)CH$—O—, $CH_2$=$CHCH_2(CH_3)$CH—O—, $CH_3CH$=$CH(CH_3)CH$—O— and $CH_3CH$=$CH(C_2H_5)CH$—O—, and the like. Alkenoxy groups having 3 to 10 carbon atoms are generally preferred. Accordingly, n is preferably 3 to 10.

The term "alkoxy-alkyl" preferably encompasses straight-chain radicals of the formula $C_nH_{2n+1}$—O—$(CH_2)_m$, in which n and m each, independently of one another, denote an integer from 1 to 10, with the proviso that the sum of n and m be integer from 2 to 15. Alkoxy-alkyl groups in which the sum of n and m is an integer from 3 to 10 are generally preferred. Preferably, n is 1 and m is 1 to 6.

In a preferred embodiment of the present disclosure, the liquid-crystalline medium includes one or more compounds of the formula I and one or more compounds of the formula II.

In a preferred embodiment of the present disclosure, the liquid-crystalline medium includes one or more compounds of the formula I and one or more compounds of the formula III.

In a preferred embodiment of the present disclosure, the liquid-crystalline medium includes one or more compounds of the formula II and one or more compounds of the formula III.

In a preferred embodiment of the present disclosure, the liquid-crystalline medium includes one or more compounds of the formula I, one or more compounds of the formula II and one or more compounds of the formula III.

In a preferred embodiment of the present disclosure, the liquid-crystalline medium preferably has a total concentration of the compounds of the formula I in the range from 10% to 60% by mass.

In a preferred embodiment of the present disclosure, the liquid-crystalline medium preferably has a total concentration of the compounds of the formula II in the range from 2% to 40% by mass.

In a preferred embodiment of the present disclosure, the liquid-crystalline medium preferably has a total concentration of the compounds of the formula III in the range from 1% to 30% by mass.

In a preferred embodiment of the present disclosure, the liquid-crystalline medium preferably includes the one or more compounds of the formulas I, II, and/or III in a total concentration of 10% to 100% by mass, more preferably 30% to 95% by mass, even more preferably 40% to 90% by mass, and very preferably 50% to 90% by mass of the medium as a whole. The liquid crystal compounds of the formulas I, II, III according to the present disclosure make it possible to create new liquid crystal compositions with high optical anisotropy ($\Delta n$), a positive dielectric anisotropy ($\Delta \varepsilon$ or $\Delta \in$) and a wide temperature range of the nematic phases.

Throughout this specification, the optical anisotropy ($\Delta n$) is determined at a wavelength of 589.3 nm and at a temperature of 20° C., and the dielectric anisotropy ($\Delta \varepsilon$ or $\Delta \in$) is determined at a frequency of 1 KHz and at a temperature of 20° C.

The dielectric anisotropy in the microwave region is defined as:

$$\Delta \in = (\in_{r,\parallel} - \in_{r,\perp})$$

In the equation above, $\in_{r,\parallel}$ and $\in_{r,\perp}$ are a relative dielectric constant when the director and the electric field are parallel (i.e., a relative dielectric constant for homeotropic orientation), and a relative dielectric constant when the director and the electric field are perpendicular (i.e., a relative dielectric constant for homogeneous orientation).

The tunability ($\tau$) is defined as:

$$\tau = \Delta \in / \in_{r,\parallel}$$

The material quality factor (η) is defined as:

$\eta = (\tau / \tan \delta_{\epsilon_r, max})$, where the maximum dielectric loss, tan $\delta \epsilon_{r, max}$, is tan $\delta_{\epsilon_r \cdot max} = \max\{\tan \delta_{\epsilon_r \cdot \perp}; \tan \delta_{\epsilon_r \cdot \parallel}\}$.

The material quality factor (η) of the preferred liquid-crystalline medium is 6 or more, preferably 8-20 or more, particularly 25 or more, very particularly 30, and in particular 40 or more.

The liquid crystal compounds of the formulas I, II, III according to the present disclosure make it possible to create new liquid crystal compositions with high material quality factor (η), due to the fact that these compounds have a long rigid structure with bulk elongated polar groups without bridging fragments.

Thus, the present disclosure provides a component for high-frequency technology, which includes the liquid-crystalline medium according to the present disclosure. Preferably, the component according to the present disclosure is suitable for operation in the microwave range. Preferably, the component according to the present disclosure is a phase shifter.

Also, the present disclosure provides a microwave antenna array which includes one or more components according to the present disclosure.

In addition, the present disclosure provides a process for preparing the liquid-crystalline medium according to the present disclosure, wherein one or more compounds of the formula I are mixed with one or more compounds selected from the compounds of the formulas II and/or III, and optionally with one or more further compounds and/or with one or more additives.

The components for high-frequency technology according to an aspect of another exemplary embodiment include the liquid-crystalline medium according to an aspect of an exemplary embodiment above. In the present disclosure, high-frequency technology denotes applications having frequencies in the range from 1 MHz to 1 THz, particularly from 1 GHz to 500 GHz, more particularly 2 GHz to 300 GHz, more particularly 5 GHz to 150 GHz. This component may also be suitable for operation in the microwave range. This component may be a phase shifter.

The microwave antenna array according to an aspect of another exemplary embodiment includes one or more components according to an aspect of another exemplary embodiment above.

In addition, the process for preparing the liquid-crystalline medium according to an aspect of an exemplary embodiment above includes a step in which one or more compounds of the formula I are mixed with one or more compounds selected from the compounds of the formulas II and/or III, and optionally with one or more further compounds and/or with one or more additives.

EXAMPLES

The following examples illustrate the present disclosure without limiting it in any way. However, it becomes clear to a person skilled in the art from the physical properties what properties can be achieved and in what ranges they can be modified. In particular, the combination of the various properties which can be preferably achieved is thus well defined for a person skilled in the art.

The present disclosure is described in more detail by Examples 1 to 19 and the data presented in Table 1. However, these Examples do not limit the scope of the present disclosure. In these examples, all quantities measured in "%" are mass fractions of the substance in question, i.e. the ratio of the mass of that substance to the mass of the mixture. A concentration stated herein in "%" is the ratio of the mass of the solute or substance in question to an amount of 100 g of the solution or mixture.

Example 1: Synthesis of 4-trifluoromethylsulpho-nyl-3'-methyl-4'-pentyl-p-terphenyl

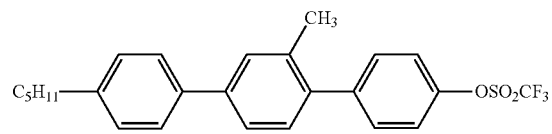

Phase sequence: C, 38° C.; I, Δn=0.298; Δε=7.6.

Example 1-1: Synthesis of 6-(4-methoxyphenyl)-3-(4-pentylphenyl)cyclohex-2-enone A mixture of 28.4 g (0.1 mol) 1-dimethylaminopropanoyl-4-pentylbenzene hydrochloride which had been prepared from the corresponding ketone through Mannich reaction, 16.4 g (0.1 mol) of 4-methoxyphenylacetone and 16.8 g (0.3 mol) of potassium hydroxide in 200 ml of dioxane was refluxed for 6 hours under stirring. After cooling to room temperature, 500 ml of a 5% sulfuric acid solution was added carefully and an obtained product was twice extracted with methylene chloride. The organic layer was washed with water, was dried over anhydrous magnesium sulfate and was filtered through a short column with silica gel. The residue obtained after the solvent evaporation was recrystallized from isopropyl alcohol. Yield was 62%.

Example 1-2: Synthesis of 4-methoxy-3'-methyl-4"-pentyl-p-terphenyl

A solution of 6-(4-methoxyphenyl)-3-(4-pentylphenyl) cyclohex-2-enone (11.5 g, 0.033 mol) in 80 ml of tetrahydrofuran (THF) was treated under stirring with an ethereal solution of methyl magnesium iodide prepared from 1.6 g (0.066 mol) of magnesium. The reaction mixture was stirred for three hours at 35° C. and then was kept overnight. After usual acidic treatment, the ethereal solution of the corresponding diene was obtained. The ether was then distilled off and replaced with toluene. Air was passed through the diene solution under reflux during five hours for the oxidation of the diene to the corresponding aromatic compound (GC control). After cooling to room temperature, the solution was filtered through silica gel and toluene was distilled off at reduced pressure. The obtained product was crystalized from acetone, yield was 82%.

Example 1-3: Synthesis of 4-hydroxy-3'-methyl-4"-pentyl-p-terphenyl

A 1.0M solution of boron tribromide in methylene chloride (2.7 ml) was slowly added under stirring to a solution of 9.0 g (0.026 mol) of 4-methoxy-3'-methyl-4"-pentyl-p-terphenyl in 100 ml of dry methylene chloride at −25-30° C. The reaction mixture was kept at room temperature overnight and was poured into 100 ml of 10% hydrochloric acid. The organic layer was separated and washed with water and was dried over anhydrous magnesium sulphate. After the solvent had been removed, the obtained product was enough pure to be used for the further transformation.

Example 1-4: Synthesis of 4-trifluoromethylsulphonyl-3'-methyl-4'-pentyl-p-terphenyl 4-hydroxy-3'-methyl-4''-pentyl-p-terphenyl (about 9.0 g) was dissolved in 50 ml of dry pyridine and trifluoromethanesulphonic anhydride (5.0 ml, 0.03 mol) was added under stirring at −10° C. The reaction mixture was stirred at room temperature overnight and was then treated with cold 10% hydrochloric acid to remove pyridine. The final product was twice extracted with methylene chloride. The solution was washed with water and dried over anhydrous magnesium sulphate. After the solvent had been removed, the obtained product was dissolved in hexane-ethyl acetate mixture (5:1 vol.) and purified on a column with silica gel. Finally, the product was crystallized from acetone. Yield was 86%.

Example 2: Synthesis of 4-isothiocyanato-3,3-difluoro-2''-chloro-4'''-pentyl-p-quaterphenyl

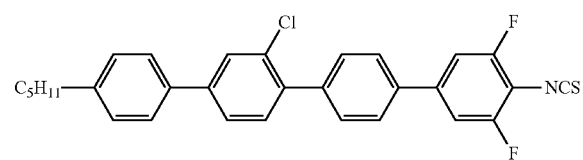

Phase sequence: C, 74.2° C.; N, 256.4° C.; I, Δn=0.456; Δε=7.2.

Example 2-1: Synthesis of 6-(4-bromophenyl)-3-(4-pentylphenyl)cyclohex-2-enone It was prepared according the procedure described in Example 1-1 from 1-dimethylaminopropanoyl-4-pentylbenzene hydrochloride which had been prepared from the corresponding ketone through Mannich reaction and 4-bromophenylacetone. The yield was 59%; melting point (m.p.) 122-123° C.

Example 2-2: Synthesis of 4-bromo-3'-chloro-4''-pentyl-p-terphenyl

Phosphorous pentachloride (31.3 g, 0.15 mol) was slowly added to a solution of 6-(4-bromophenyl)-3-(4-pentylphenyl)cyclohex-2-enone (39.7 g, 0.1 mol) in 500 ml of toluene under stirring. The reaction mixture was refluxed for 5-6 hours and then was poured into a mixture of 5% sodium hydroxide solution with ice. The organic layer was separated and washed with water, was diluted with hydrochloric acid and again with water. The resulting solution was filtered through a short column with silica gel. After the solvent had been removed, the obtained residue was solved in hexane and purified by filtration through the column with silica gel. After the solvent had been removed, the product was recrystallized from an isopropyl alcohol-hexane mixture. The yield was 42%; Cr, 73° C.; N, 81° C.; Iso.

Example 2-3: Synthesis of 3'-chloro-4''-pentyl-p-terphenyl-4-boronic acid

4-Bromo-3'-chloro-4''-pentyl-p-terphenyl (8.27 g, 0.02 mol) was dissolved in 100 ml of dry tetrahydrofuran (THF) and this solution was cooled to −78° C. Under stirring, 14 ml of 1.5M n-butyllithium in hexane was added and the reaction mixture was kept at −78° C. for 2 hours. Trimethylborate (0.02 mol) in 10 ml of THF was then added at the same temperature and the reaction mixture was then stirred for 3 hours at room temperature. Hydrolysis with 10% hydrochloric acid (2 ml) for 2 hours gave a mixture from which the organic solvent was distilled out completely. After adding of hexane, the mixture was cooled in a refrigerator and the precipitate was filtered out and was several times washed with hexane on a filter. Drying on air gave a final product which can be used in a cross-coupling reaction directly or converted into a more soluble cyclic ester by interaction with 1,3-propandiol.

Example 2-4: Synthesis of 4-isothiocyanato-3,3-difluoro-2''-chloro-4'''-pentyl-p-quaterphenyl The mixture of 3'-chloro-4''-pentyl-p-terphenyl-4-boronic acid (from Example 2-3) (3.78 g, 0.01 mol), 4-iodo-2,6-difluoroaniline (2.55 g, 0.01 mol), potassium carbonate (5.52 g, 0.04 mol), 50 ml of acetone and 20 ml of water was refluxed under stirring in an argon atmosphere and 50 mg of palladium acetate was added. The reaction mixture was then refluxed additionally for 2 hours. Thin-layer chromatography (TLC) revealed the complete disappearance of the starting material. Acetone was distilled out and 59 ml of chloroform was added. The reaction mixture was acidified with hydrochloric acid until pH<7 and at room temperature 0.01 mol of thiophosgene was added under stirring. The reaction mixture was stirred overnight. After filtering, the organic layer was separated, was washed with water and was dried over anhydrous magnesium sulphate. The solution was filtered through a short column with silica gel and the solvent was distilled out. The residue was crystallized from acetone and was dried on air. The obtained material was then dissolved in 100 ml of hot hexane and was filtered through a column with silica gel. After the solvent had been removed, the final product was twice crystallized from acetone.

Example 3: Synthesis of 4-isothiocyanato-3,3-difluoro-2''-methyl-4'''-pentyl-p-quaterphenyl

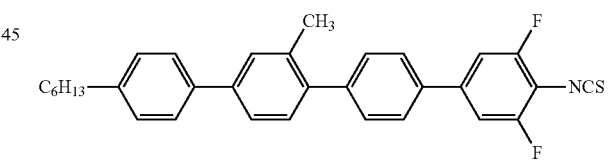

Phase sequence: C, 82.3° C.; N, 222.4° C.; I, Δn=0.458; Δε=7.3.

Example 3-1: Synthesis of 6-(4-bromophenyl)-3-(4-pentylphenyl)cyclohex-2-enone It was prepared according the procedure described in Example 1-1 from 1-dimethylaminopropanoyl-4-pentylbenzene hydrochloride which had been prepared from the corresponding ketone through Mannich reaction and 4-bromophenylacetone.

Example 3-2: Synthesis of 4-bromo-3'-methyl-4''-pentyl-p-terphenyl

It was prepared by methylation of 6-(4-bromophenyl)-3-(4-pentylphenyl)cyclohex-2-enone with methylmagnesium iodide according the procedure described in Example 1-2. The yield was 67%, m.p. 82-83° C.

Example 3-3: Synthesis of 3'-methyl-4'-pentyl-p-terphenyl-4-boronic acid

It was prepared from 4-bromo-3'-methyl-4"-pentyl-p-terphenyl according the procedure described in Example 2-3.

Example 3-4: Synthesis of 4-isothiocyanato-3,3-difluoro-2"-methyl-4'''-pentyl-p-quaterphenyl It was prepared by cross-coupling of 3'-methyl-4'-pentyl-p-terphenyl-4-boronic acid with 4-iodo-2,6-difluoroaniline, followed by the reaction with thiophosgene according the procedure described in Example 2-4.

Example 4: Synthesis of 2',3'-difluoro-3'''-methyl-4,4''''-dipentyl-p-quinquephenyl

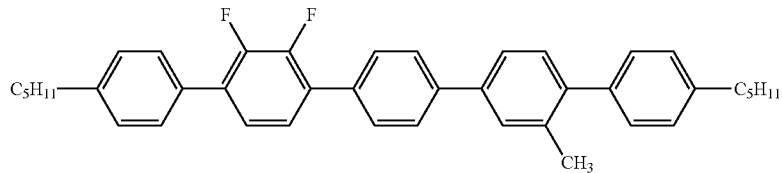

Phase sequence: C, 134.2° C.; N, 286.4° C.; I, Δn=0.443; Δε=−0.8.

Example 4-1: Synthesis of 3-(4-bromophenyl)-6-(4-pentylphenyl)cyclohex-2-enone It was prepared according the procedure described in Example 1-1 from 1-dimethylaminopropanoyl-4-bromobenzene hydrochloride which had been prepared from 4-bromoacetophenone through Mannich reaction and 4-pentylphenylacetone. The yield was 65%, m.p. 83-84° C.

Example 4-2: Synthesis of 4-bromo-2'-methyl-4"-pentyl-p-terphenyl

It was prepared by methylation of 3-(4-bromophenyl)-6-(4-pentylphenyl)cyclohex-2-enone with methylmagnesium iodide according the procedure described in Example 1-2. The yield was 71%.

Example 4-3: Synthesis of 2'-methyl-4"-pentyl-p-terphenyl-4-boronic acid

It was prepared from 4-bromo-2'-methyl-4"-pentyl-p-terphenyl according the procedure described in Example 2-3.

Example 4-4: Synthesis of 2',3'-difluoro-3'''-methyl-4,4''''-dipentyl-p-quinquephenyl A mixture consisting of 2'-methyl-4"-pentyl-p-terphenyl-4-boronic acid (3.58 g, 0.01 mol), 4-iodo-2,3-difluoro-4'-pentylbiphenyl (it was prepared by cross-coupling of 4-methoxyphenylboronic acid with 1-iodo-2,3-difluorobenzene followed by lithiation with n-butyllithium and iodation with iodine) (3.86 g, 0.01 mol), anhydrous potassium carbonate (5.52 g, 0.04 mol), 250 ml acetone and 20 ml of water was stirred under an argon atmosphere for 0.5 hour, then 0.05 g of palladium acetate was added and the reaction mixture was stirred at boiling until complete disappearance of the starting material. The reaction mixture was then kept in a refrigerator overnight and was filtered. The precipitate was several times extracted with hot ethylacetate and the resulting solution was filtered through a short column with silica gel. The solvent was evaporated at a reduced pressure and the final product was purified on a chromatography column filled with silica gel at 60° C. Cyclohexane was used as the eluent. The obtained colorless solid was crystallized from an acetone-light petroleum mixture. The yield was 55%.

Example 5: Synthesis of 2',2'-difluoro-3'''-methyl-4,4''''-dipentyl-p-quinquephenyl

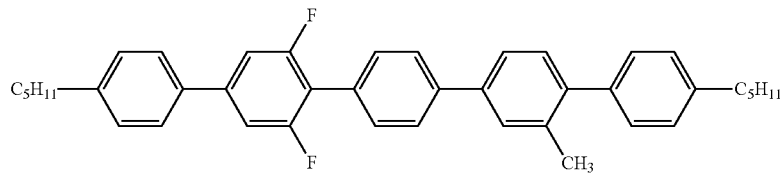

Phase sequence: C, 114.2° C.; N, 277.4° C.; I, Δn=0.444; Δε=+0.8.

It was prepared by cross-coupling of 2'-methyl-4"-pentyl-p-terphenyl-4-boronic acid (from Example 4-3) with 4-iodo-3,3-difluoro-4'-pentylbiphenyl (it was prepared by cross-coupling of 4-methoxyphenylboronic acid with 1-iodo-2,3-difluorobenzene followed by lithiation with n-butyllithium and iodation with iodine) according the procedure described in Example 4-4. Yield was 62%.

Example 6

A liquid crystal (LC) mixture A-1 of the following composition based on well-known compounds has been prepared by mixing the following compounds with the designated amounts:

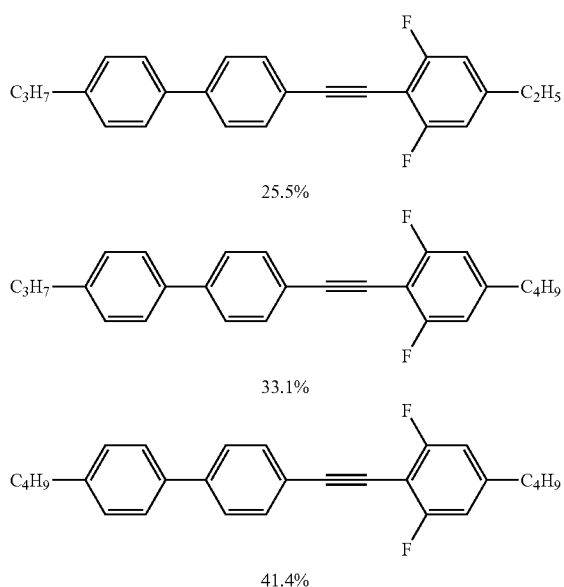
Transition temperatures: Cr, 12.3° C.; N, 128.1° C.; I.
Example 7
A LC mixture B-1 of the following composition has been prepared by mixing the following compounds with the designated amounts:
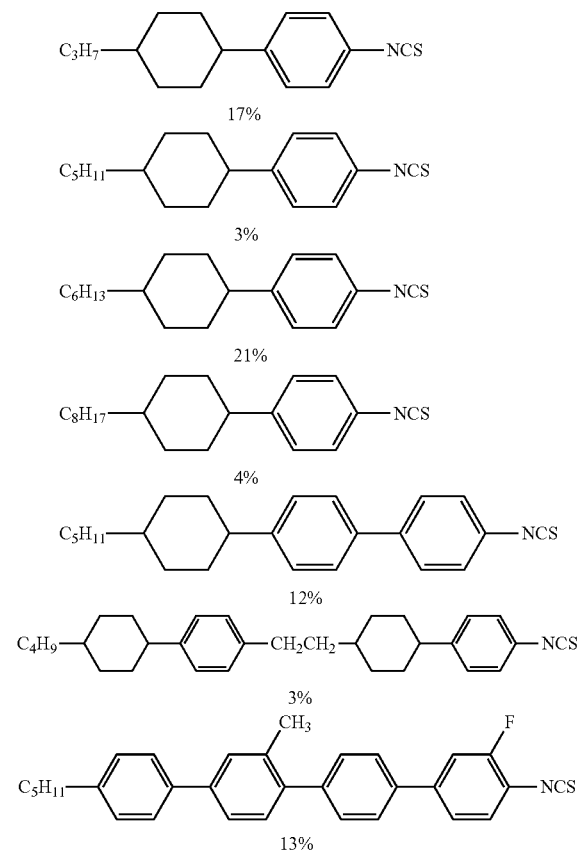
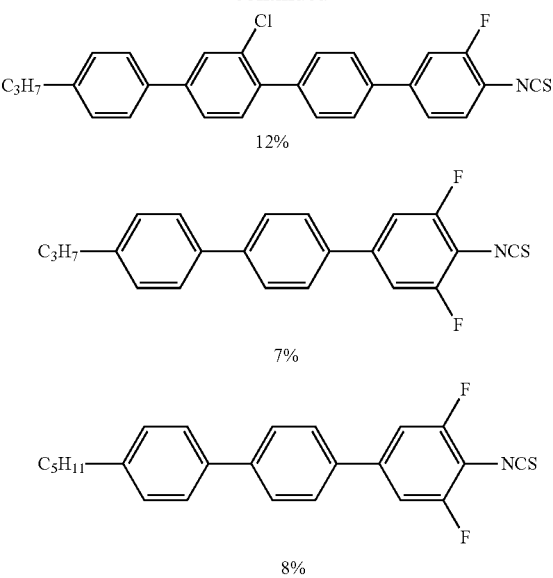
Transition temperatures: Cr, −2.3° C.; N, 98.2° C.; I.
Example 8
A LC mixture B-2 of the following composition has been prepared by mixing the following compounds with the designated amounts:
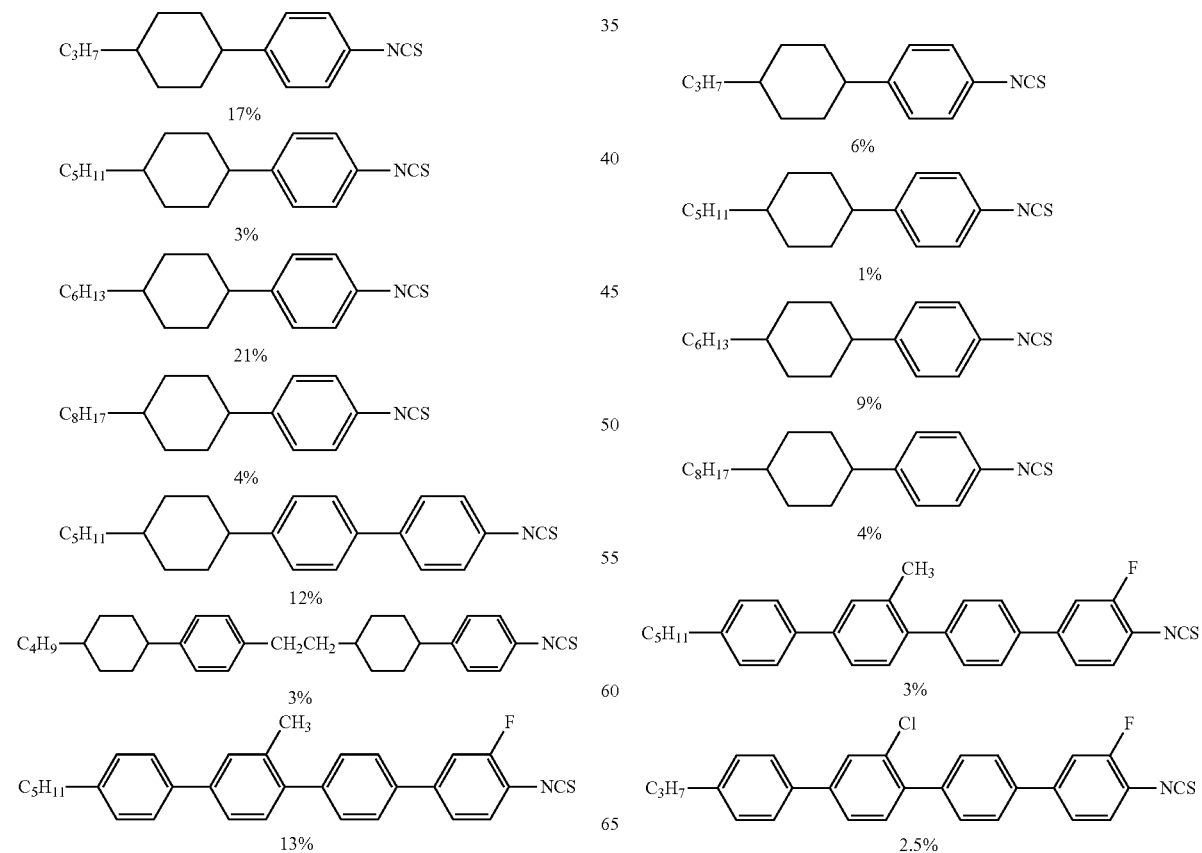

-continued
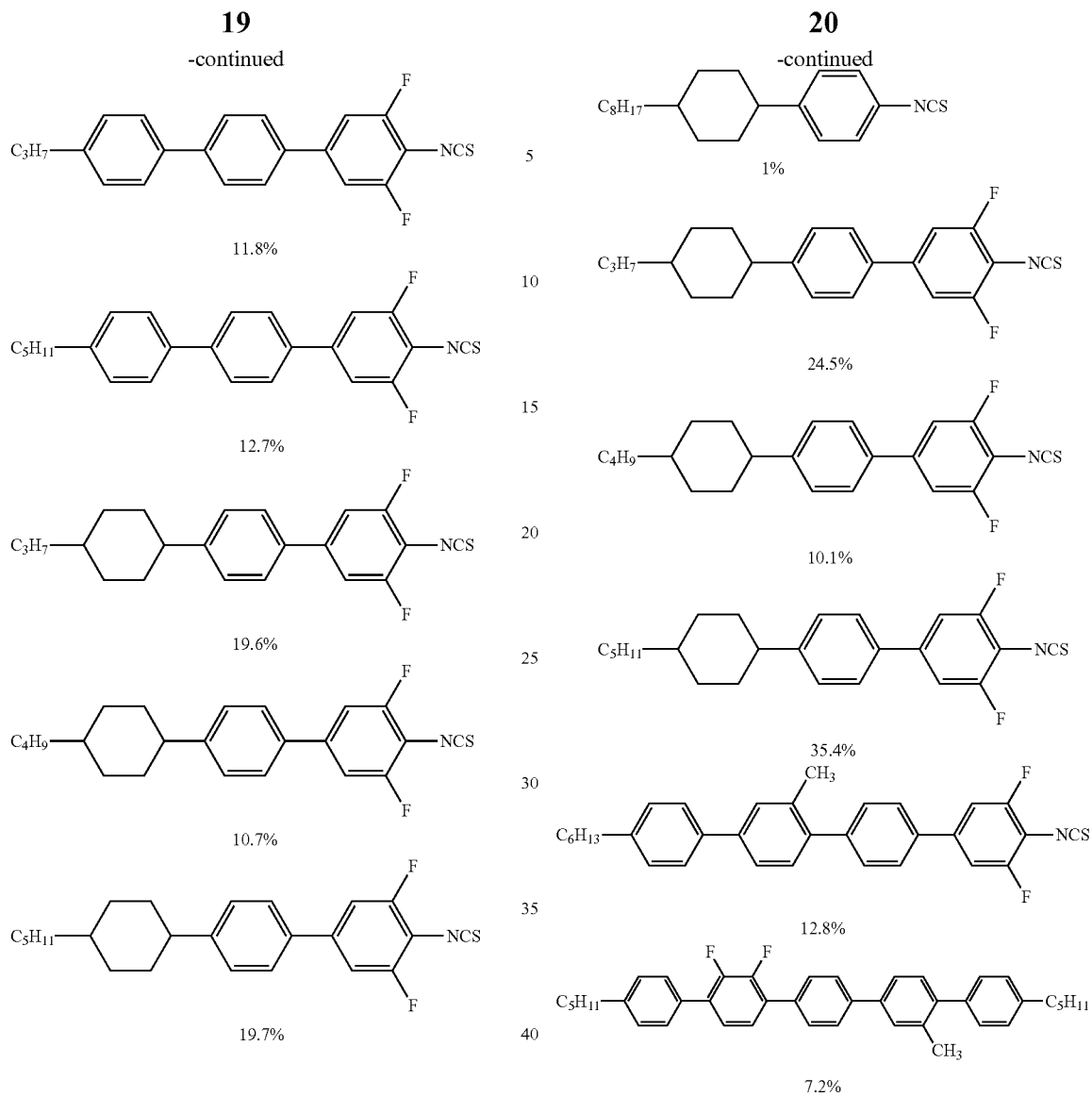
Transition temperatures: Cr, +3° C.; N, 128.6° C.; I.
Example 9
A LC mixture B-3 of the following composition has been prepared by mixing the following compounds with the designated amounts:
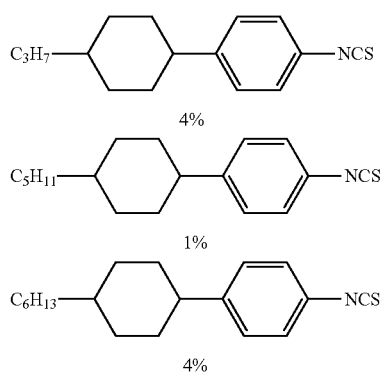
Transition temperatures: Cr, +12.3° C.; N, 136.4° C.; I.
Example 10
A LC mixture B-4 of the following composition has been prepared by mixing the following compounds with the designated amounts:
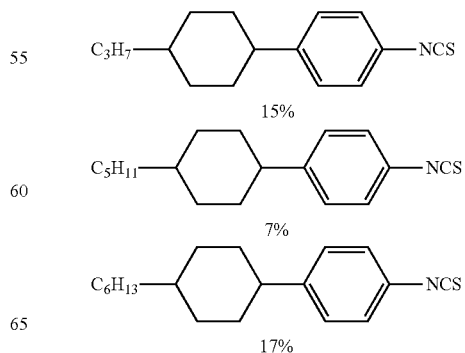

-continued

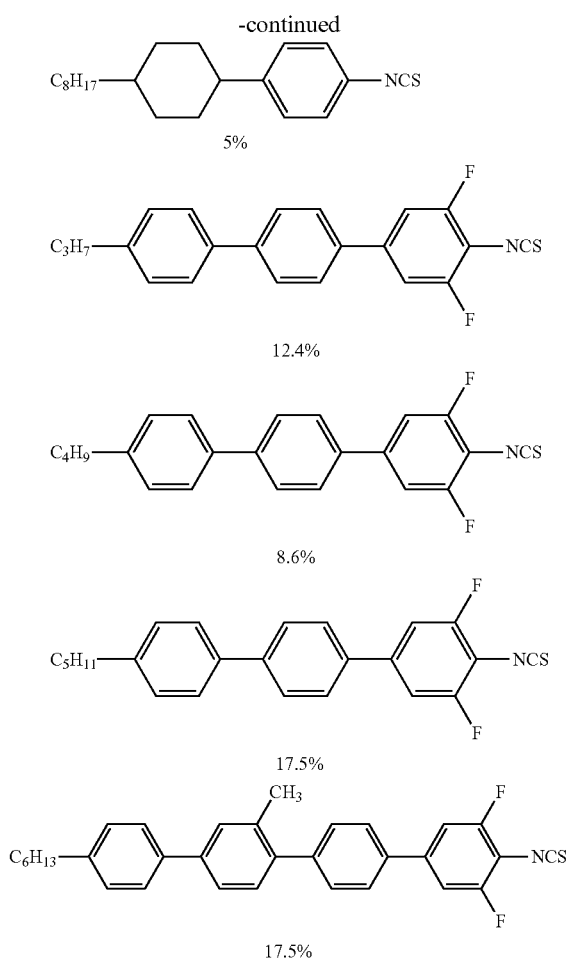

Transition temperatures: Cr, −5.3° C.; N, 96.4° C.; I.

Example 11

A LC mixture B-5 of the following composition has been prepared by mixing the following compounds with the designated amounts:

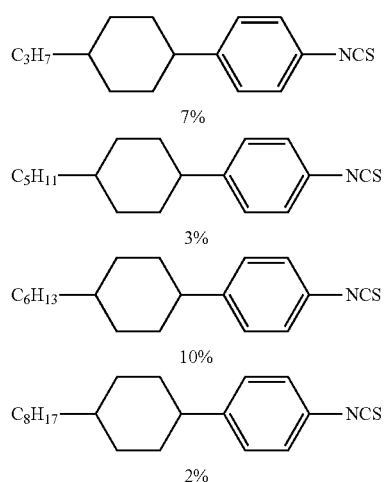

-continued

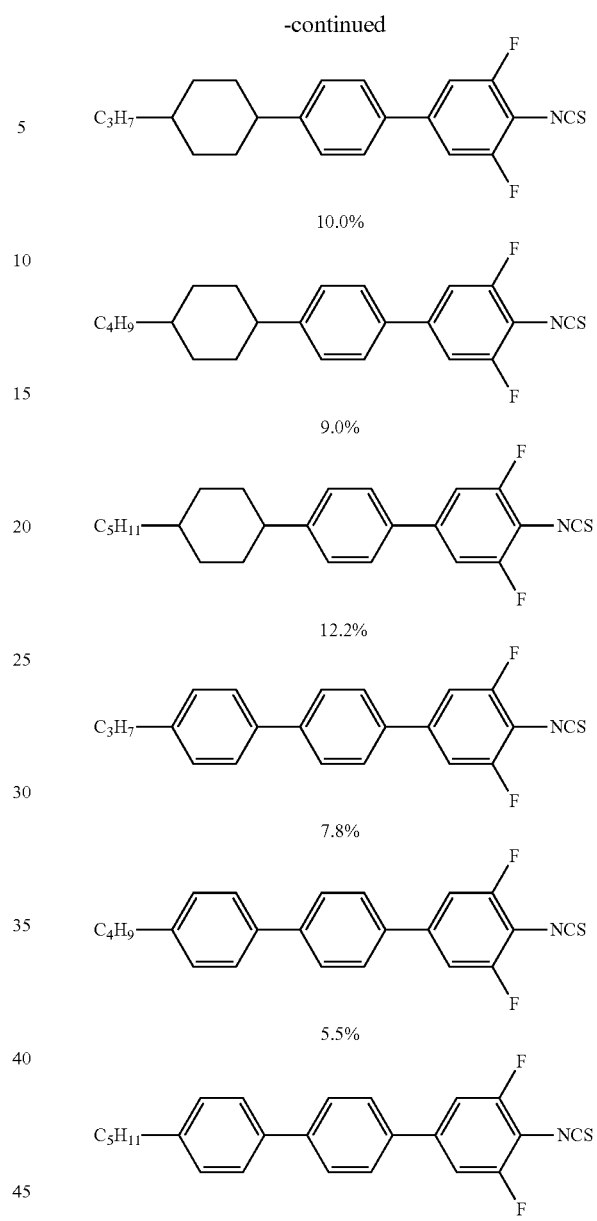

Transition temperatures: Cr, +5.7° C.; N, 116.4° C.; I.

Example 12

A LC mixture B-6 of the following composition has been prepared by mixing the following compounds with the designated amounts:

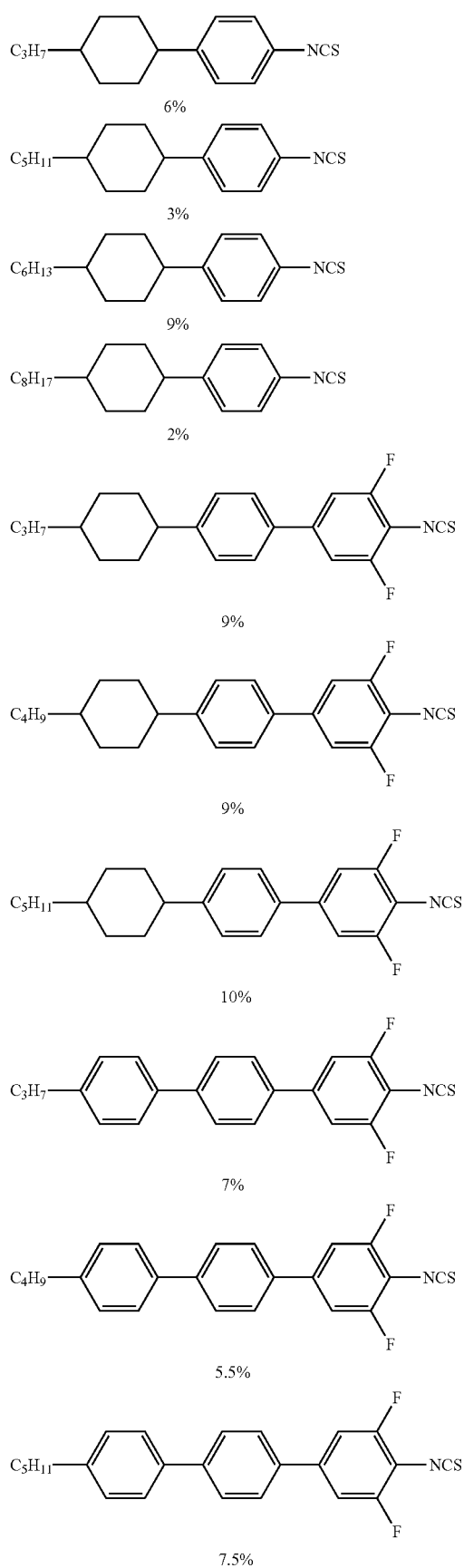
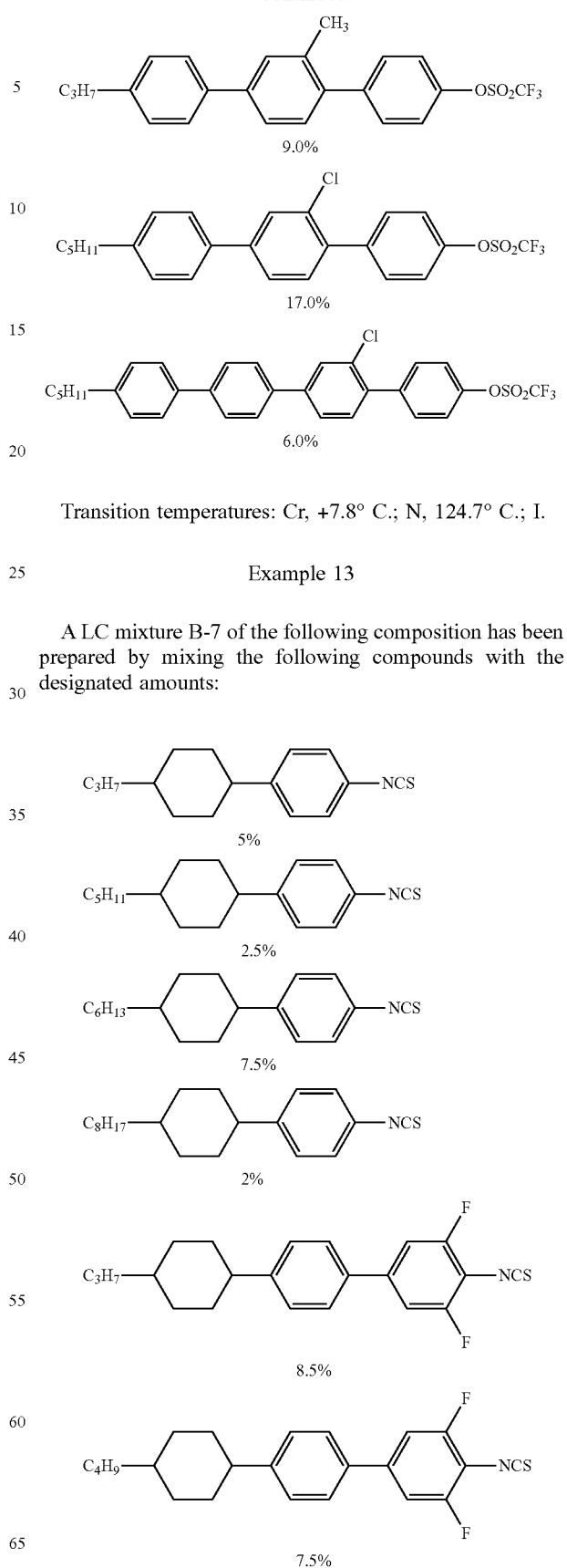
Transition temperatures: Cr, +7.8° C.; N, 124.7° C.; I.
Example 13
A LC mixture B-7 of the following composition has been prepared by mixing the following compounds with the designated amounts:
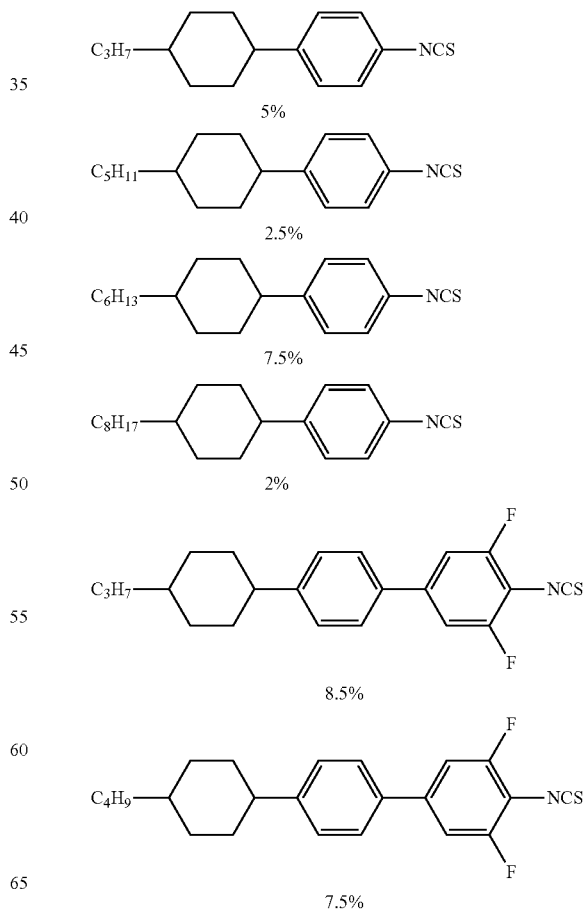

-continued
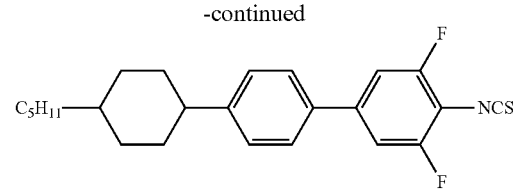
9.0%
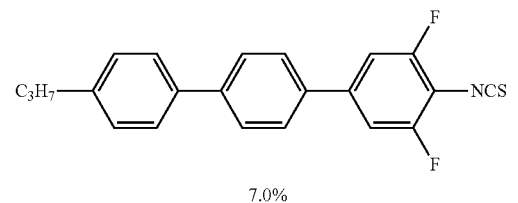
7.0%
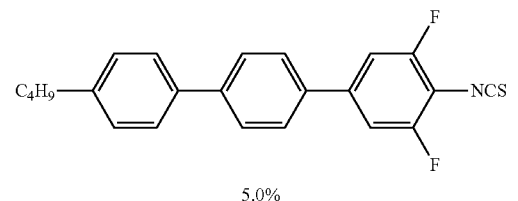
5.0%
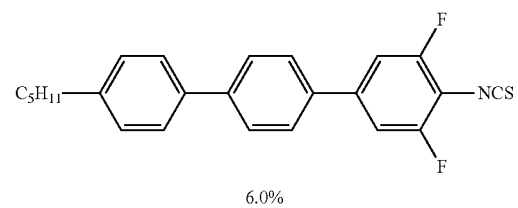
6.0%
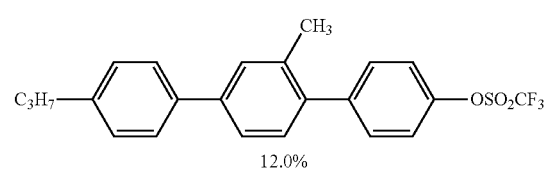
12.0%
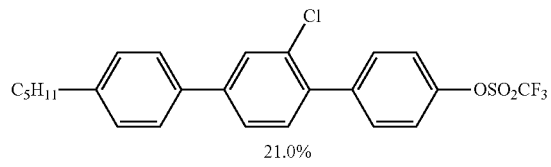
21.0%
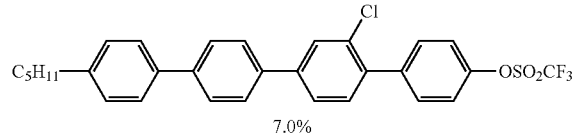
7.0%
Transition temperatures: Cr, +7.0° C.; N, 131.0° C.; I.
Example 14
A LC mixture B-8 of the following composition has been prepared by mixing the following compounds with the designated amounts:
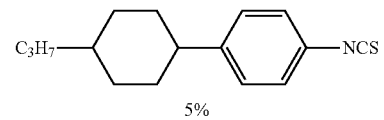
5%
-continued
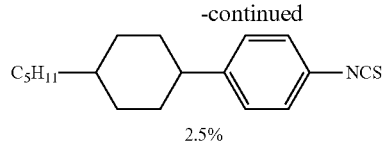
2.5%
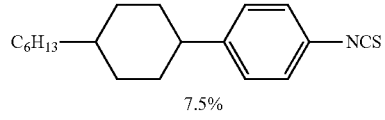
7.5%
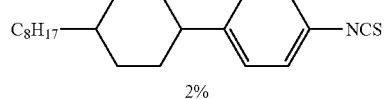
2%
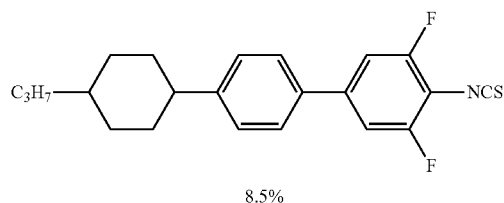
8.5%
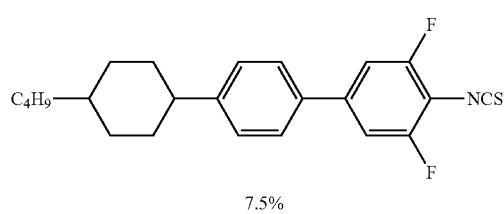
7.5%
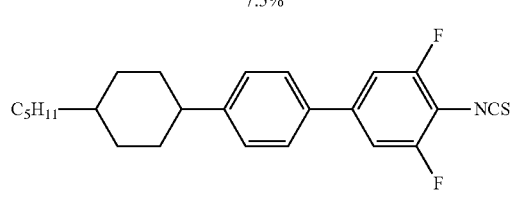
9.0%
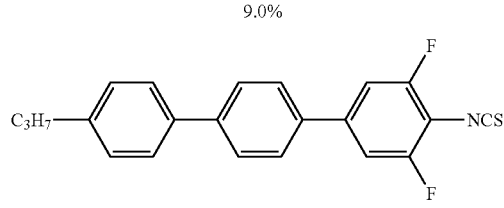
7.0%
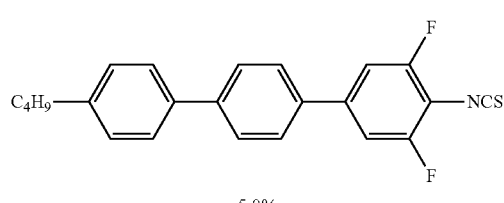
5.0%
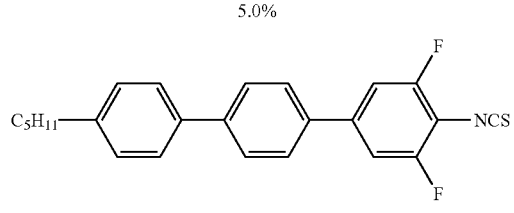
6.0%

-continued
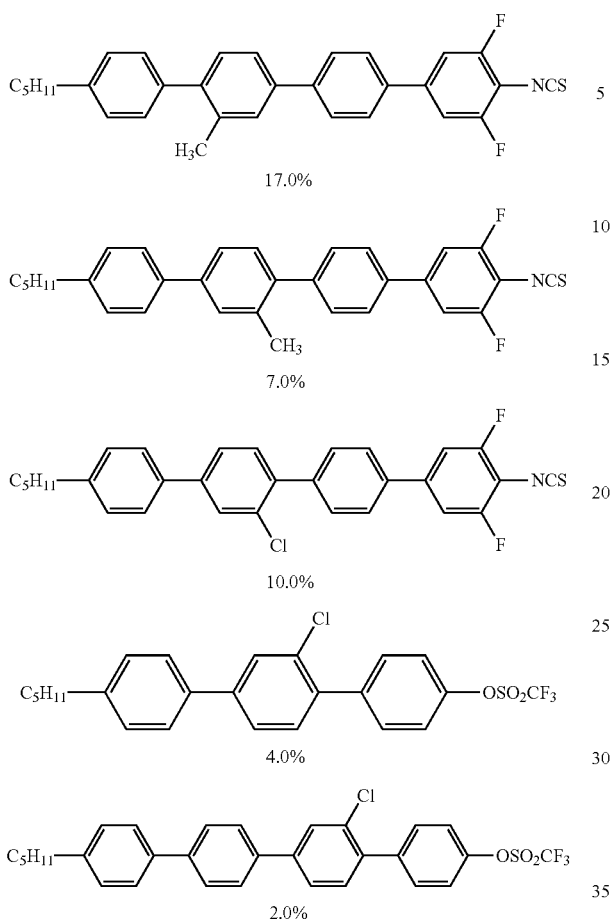
Transition temperatures: Cr, 0° C.; N, 97.0° C.; I.
Example 15
A LC mixture B-9 of the following composition has been prepared by mixing the following compounds with the designated amounts:
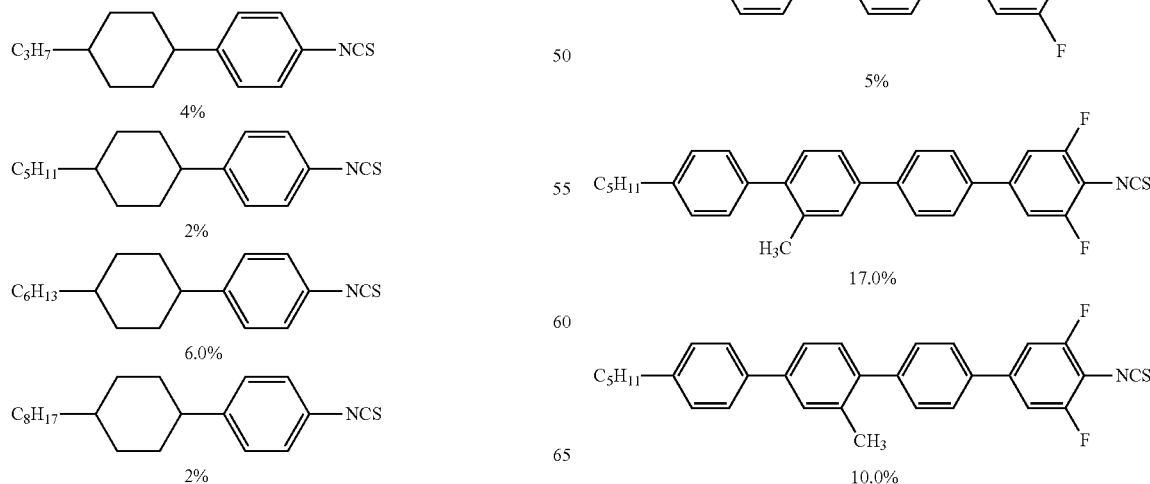

-continued

C5H11—[Ph]—[Ph(Cl)]—[Ph]—[Ph(F,F)]—NCS 10.0%

C3H7—[Ph]—[Ph(CH3)]—[Ph]—OSO2CF3

3.0%

C5H11—[Ph]—[Ph(Cl)]—[Ph]—OSO2CF3

7.0%

C5H11—[Ph]—[Ph]—[Ph(Cl)]—[Ph]—OSO2CF3

3.0%

Transition temperatures: Cr, +2.3° C.; N, 108.0° C.; I.

Example 16

A LC mixture B-10 of the following composition has been prepared by mixing the following compounds with the designated amounts:

C3H7—[Cy]—[Ph]—NCS

1%

C5H11—[Cy]—[Ph]—NCS 0.5%

C6H13—[Cy]—[Ph]—NCS

2%

C8H17—[Cy]—[Ph]—NCS 0.5%

C3H7—[Cy]—[Ph]—[Ph(F,F)]—NCS 15.0%

-continued

C4H9—[Cy]—[Ph]—[Ph(F,F)]—NCS 8.0%

C5H11—[Cy]—[Ph]—[Ph(F,F)]—NCS 17.0%

C5H11—[Ph]—[Ph(CH3)]—[Ph]—[Ph(F,F)]—NCS 21.0%

C5H11—[Ph]—[Ph]—[Ph(CH3)]—[Ph(F,F)]—NCS 9.0%

C5H11—[Ph]—[Ph]—[Ph(Cl)]—[Ph(F,F)]—NCS 12.0%

C3H7—[Ph]—[Ph(CH3)]—[Ph]—OSO2CF3

7.0%

C5H11—[Ph]—[Ph(Cl)]—[Ph]—OSO2CF3

4.0%

C5H11—[Ph]—[Ph]—[Ph(Cl)]—[Ph]—OSO2CF3

3.0%

Transition temperatures: Cr, 0° C.; N, 112.7° C.; I.

Example 17

A LC mixture B-11 of the following composition has been prepared by mixing the following compounds with the designated amounts:

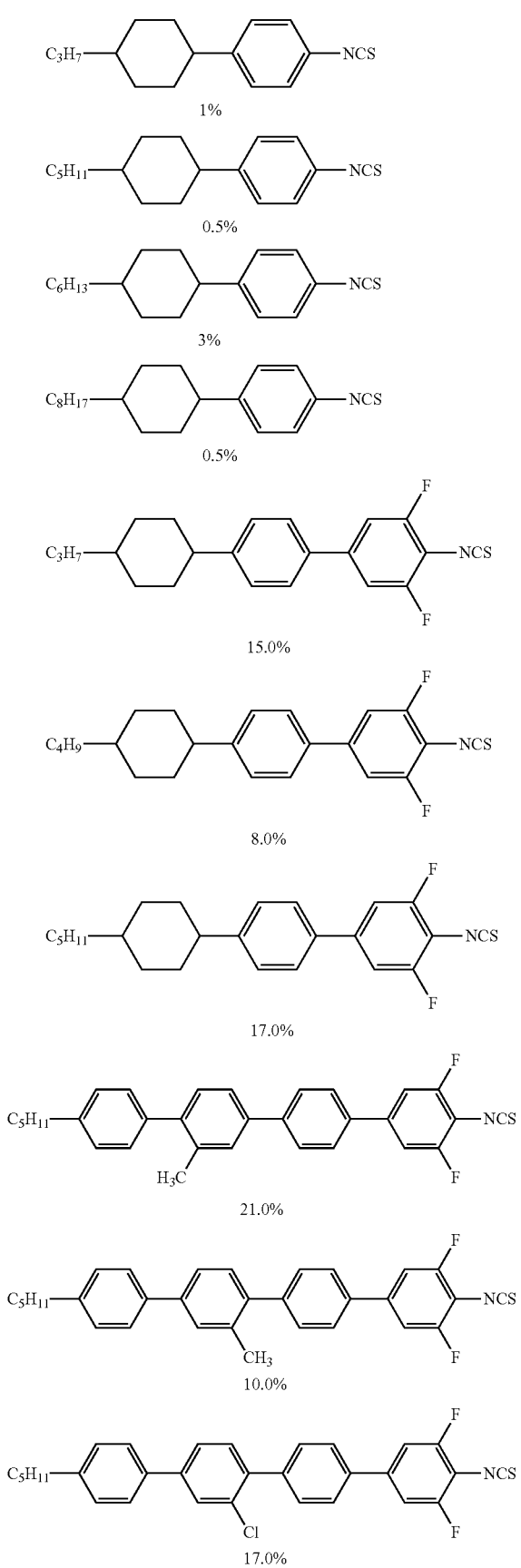
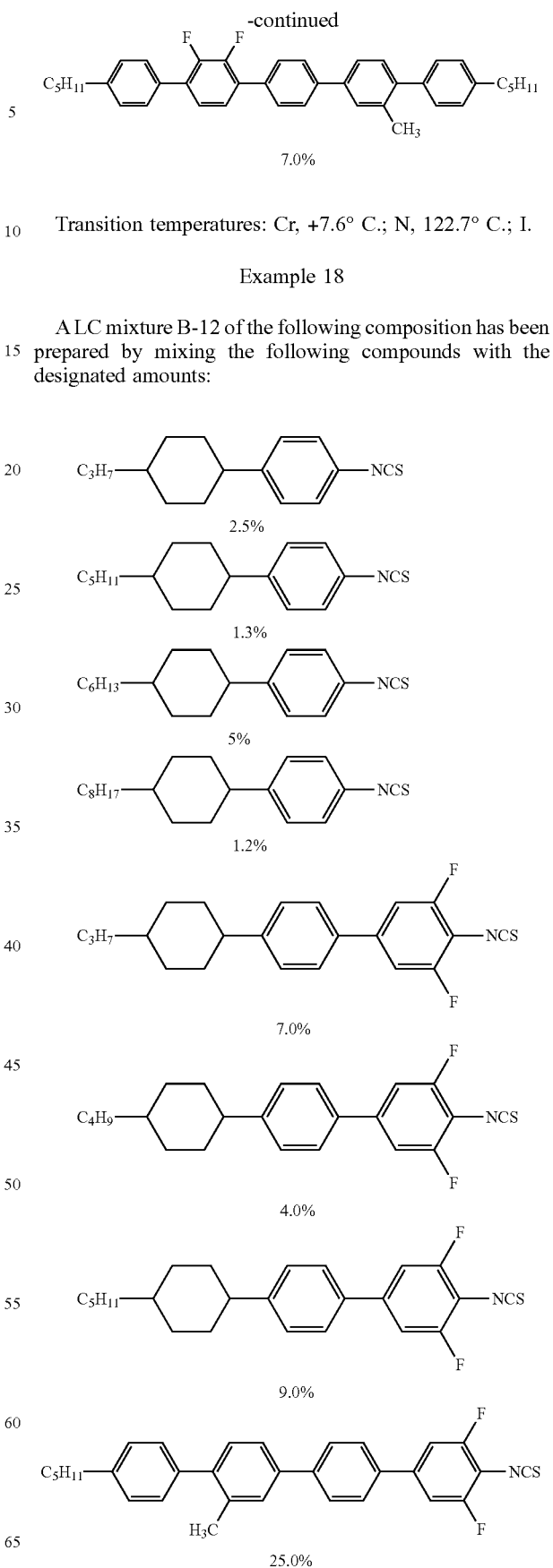
Transition temperatures: Cr, +7.6° C.; N, 122.7° C.; I.
Example 18
A LC mixture B-12 of the following composition has been prepared by mixing the following compounds with the designated amounts:

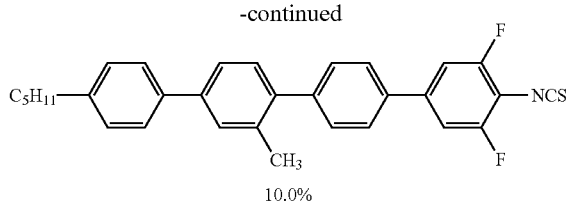
10.0%
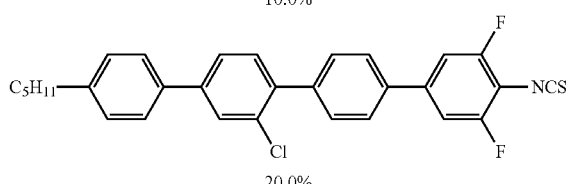
20.0%
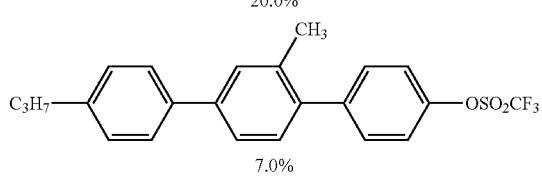
7.0%
3.0%
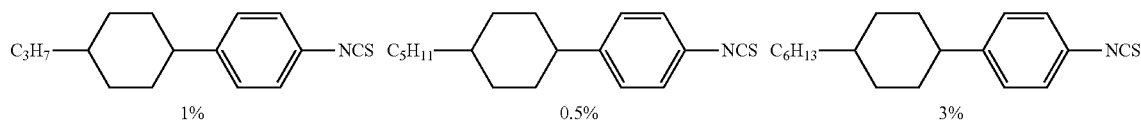
5.0%
Transition temperatures: Cr, +15.5° C.; N, 148.7° C.; I.
Example 19
A LC mixture B-13 of the following composition has been prepared by mixing the following compounds with the designated amounts:
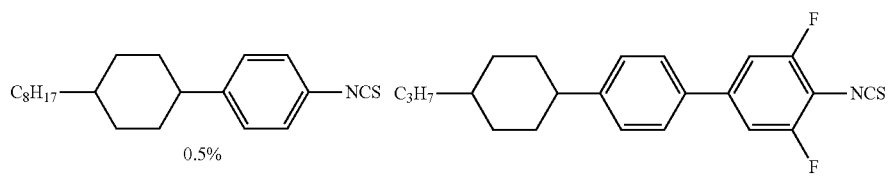
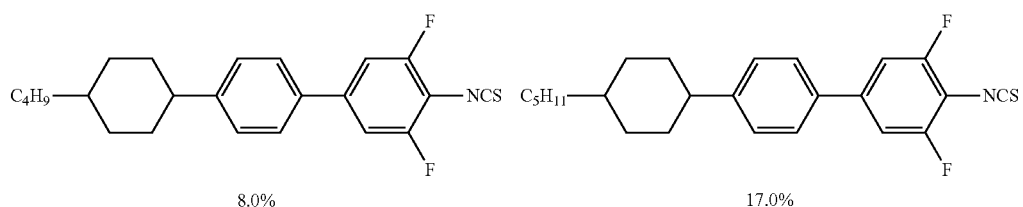
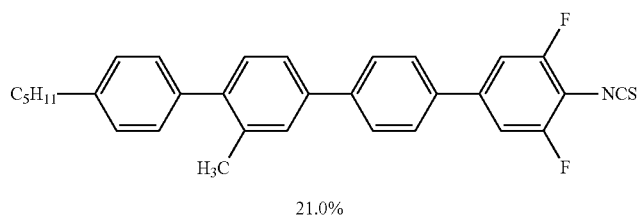
21.0%
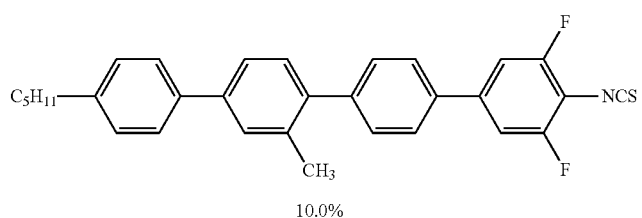
10.0%

-continued

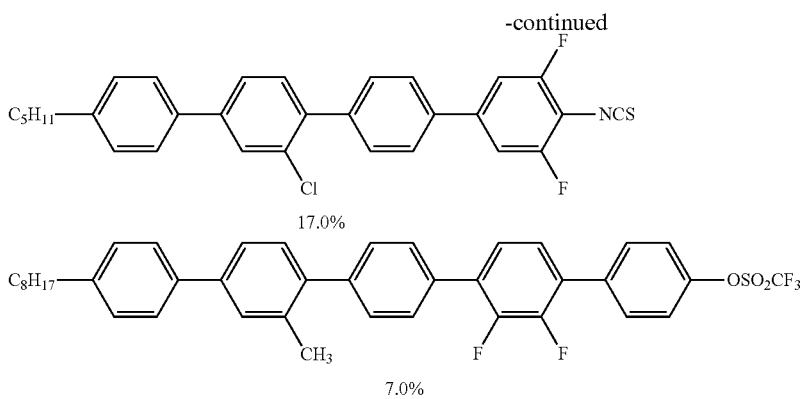

17.0%

7.0%

Transition temperatures: Cr, +4.3° C.; N, 121.3° C.; I.

TABLE 1

Parameters of the liquid crystal mixtures (LCM)

| Sample | $\varepsilon_\perp$ | $\varepsilon_{\parallel}$ | Delta | Tuneability | $tg\delta_\perp$ | $tg\delta_{\parallel}$ |
|---|---|---|---|---|---|---|
| A-1 | 2.54 | 3.25 | 0.71 | 0.22 | 0.009 | 0.003 |
| B-1 | 2.55 | 3.34 | 0.79 | 0.24 | 0.11 | 0.001 |
| B-2 | 2.55 | 3.37 | 0.82 | 0.24 | 0.011 | 0.005 |
| B-3 | 2.51 | 3.29 | 0.78 | 0.24 | 0.006 | 0.002 |
| B-4 | 2.72 | 3.52 | 0.80 | 0.23 | 0.009 | 0.004 |
| B-5 | 2.44 | 3.24 | 0.77 | 0.22 | 0.010 | 0.005 |
| B-6 | 2.51 | 3.33 | 0.79 | 0.23 | 0.009 | 0.005 |
| B-7 | 2.51 | 3.32 | 0.78 | 0.22 | 0.010 | 0.006 |
| B-8 | 2.37 | 3.49 | 1.12 | 0.32 | 0.006 | 0.004 |
| B-9 | 2.395 | 3.645 | 1.25 | 0.34 | 0.006 | 0.003 |
| B-10 | 2.46 | 3.73 | 1.27 | 0.34 | 0.005 | 0.002 |
| B-11 | 2.385 | 3.545 | 1.16 | 0.33 | 0.003 | 0.001 |
| B-12 | 2.4 | 3.74 | 1.34 | 0.36 | 0.002 | 0.001 |
| B-13 | 2.52 | 3.50 | 0.98 | 0.27 | 0.004 | 0.001 |

The mixtures B-1~B-13 are very highly suitable for applications in the microwave range, in particular for phase shifters, in comparison with the prior art mixture A-1 based on the well-known compounds.

The mezogenic compounds, especially the mixtures B-1~B-13 with maximum dielectric anisotropy, are strongly appropriate for high-frequency devices that use the effect of changing dielectric permittivity.

Examples of such devices could be the following: tunable microstrip phase shifters (where a change in dielectric parameters of a substrate varies the phase of transmitted wave on the end of line), tunable antennas (where a change in dielectric properties of the used material changes its electric size that could be used for antenna beam scanning, frequency switching, polarization switching), tunable antenna phased arrays (the same purposes as for antenna elements plus dotted dielectric permittivity changing could be used for a beam-forming creation needed), RF switches and commutators (which are based on the effect of operation resonance frequency shifting that allows us to direct the signal from one channel of a device to others).

All this make the LCs strongly appropriate for antennas and antenna elements of different purposes.

It should be understood that the exemplary embodiments described herein should be considered in a descriptive sense only and not for purposes of limitation. Descriptions of features or aspects within each embodiment should typically be considered as available for other similar features or aspects in other embodiments.

While the exemplary embodiments of the present inventive concept have been described, it will be understood by those of ordinary skill in the art that various changes in form and details may be made therein without departing from the spirit and scope of the present inventive concept as defined by the following claims.

What is claimed is:

1. A microwave antenna array comprising a liquid-crystalline medium comprising:
   at least one compound of the formula I and
   at least one compound of the formula II
   or
   at least one compound of the formula I and
   at least one compound of the formula III
   or
   at least one compound of the formula II and
   at least one compound of the formula III
   or
   at least one compound of the formula I and
   at least one compound of the formula II and
   at least one compound of the formula III

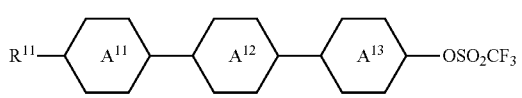

(I)

in which
$R^{11}$, independently of one another, denotes H, an alkyl or an alkoxy having 1 to 17 carbon atoms, or an alkenyl, an alkenoxy or an alkoxy-alkyl having 2 to 15 carbon atoms,

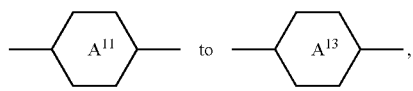

independently of one another, denote

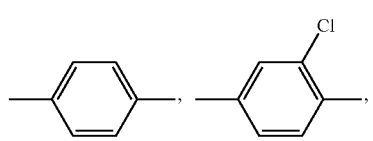

(II)

-continued

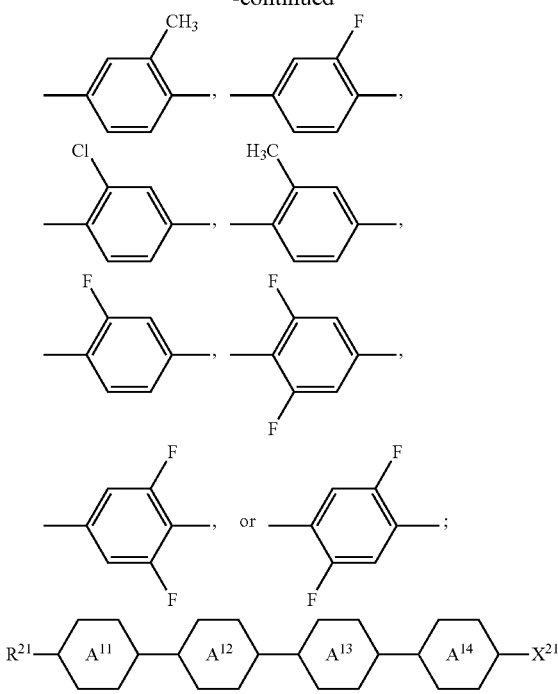

in which
R²¹, independently of one another, denotes H, an alkyl or an alkoxy having 1 to 17 carbon atoms, or an alkenyl, an alkenoxy or an alkoxy-alkyl having 2 to 15 carbon atoms,
X²¹, independently of one another, denotes —NCS or —OSO₂CF₃,

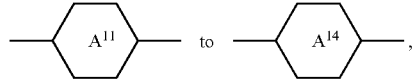

independently of one another, denote (III)

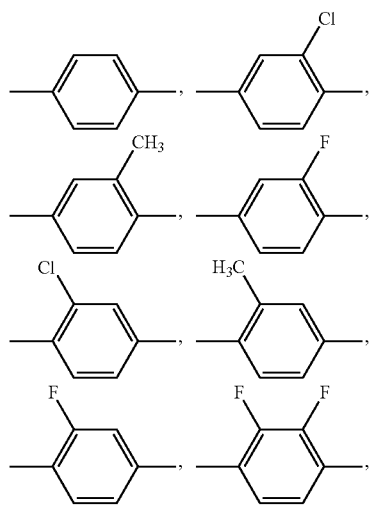

-continued

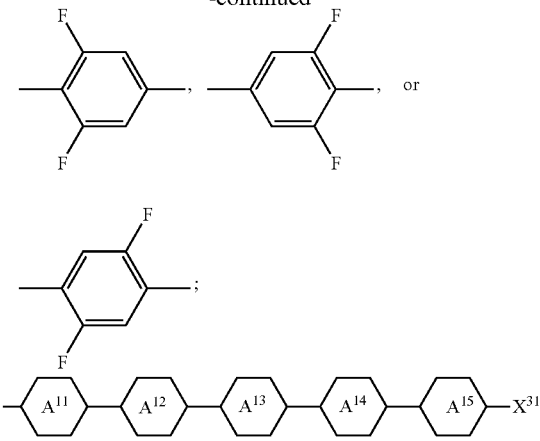

in which
X³¹, independently of one another, denotes —NCS or —OSO₂CF₃,
R³¹, independently of one another, denote H, an alkyl or an alkoxy having 1 to 17 carbon atoms, or an alkenyl, an alkenoxy or an alkoxy-alkyl having 2 to 15 carbon atoms,

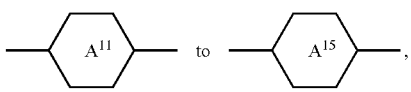

independently of one another, denote

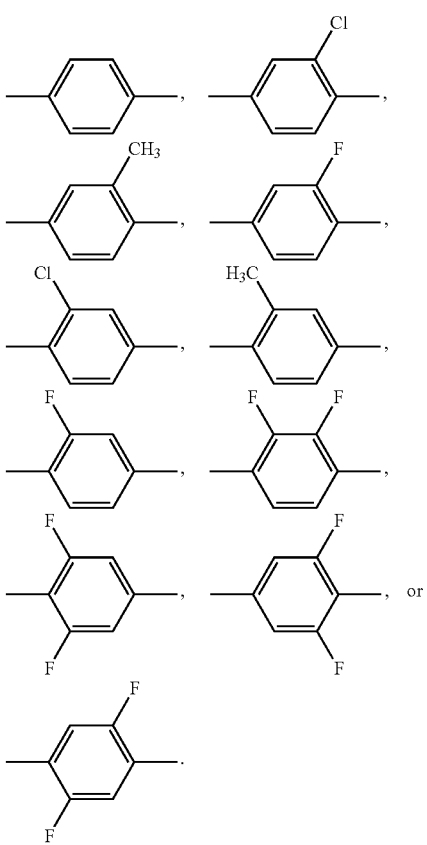

2. The microwave antenna array according to claim 1, wherein said medium comprises one or more compounds of the formula I.

3. The microwave antenna array according to claim 1, wherein said medium comprises one or more compounds of the formula II.

4. The microwave antenna array according to claim 1, wherein said medium comprises one or more compounds of the formula III.

5. The microwave antenna array according to claim 2, wherein a total concentration of the compounds of the formula I in the medium is in the range from 10% to 60% by mass.

6. The microwave antenna array according to claim 3, wherein a total concentration of the compounds of the formula II in the medium is in the range from 2% to 40% by mass.

7. The microwave antenna array according to claim 4, wherein a total concentration of the compounds of the formula III in the medium is in the range from 1% to 30% by mass.

8. The microwave antenna array according to claim 1, wherein a total concentration of the compounds of the formulas I, II, and/or III in the medium is in the range from 10% to 100% by mass.

9. The microwave antenna array according to claim 8, wherein a total concentration of the compounds of the formulas I, II, and/or III in the medium is in the range from 30% to 95% by mass.

* * * * *